United States Patent [19]

Kao

[11] 3,749,895

[45] July 31, 1973

[54] APPARATUS FOR SUPPRESSING LIMIT CYCLES DUE TO QUANTIZATION IN DIGITAL FILTERS

[75] Inventor: Chih-Yu Kao, Lawrence, Mass.

[73] Assignee: Bell Telephone Laboratories, Incorporated, Murray Hill, N.J.

[22] Filed: Oct. 6, 1971

[21] Appl. No.: 186,965

[52] U.S. Cl. .................. 235/152, 235/156, 235/164, 328/149, 333/18

[51] Int. Cl. .......................... G06f 15/34, G06f 1/02

[58] Field of Search .................... 235/152, 156, 164; 328/149, 162, 167; 307/86; 333/18, 28 R

[56] References Cited

UNITED STATES PATENTS

| | | | |
|---|---|---|---|
| 3,518,414 | 6/1970 | Goodman et al. | 235/156 X |
| 3,522,546 | 8/1970 | Jackson et al. | 328/167 |
| 3,521,042 | 7/1970 | Van Blerkom et al. | 235/156 |
| 3,521,041 | 7/1970 | Van Blerkom et al. | 235/156 |
| 3,619,586 | 11/1971 | Hoff et al. | 235/152 X |
| 3,493,874 | 2/1970 | Finkel et al. | 235/152 UX |

*Primary Examiner*—Eugene G. Botz
*Assistant Examiner*—James F. Gottman
*Attorney*—W. L. Keefauver et al.

[57] ABSTRACT

Limit cycles due to quantization (primarily multiplication truncation or round-off), occurring in the output signal quantities of a digital filter in the presence of applied sample quantities of low magnitude, are suppressed by clamping to zero the quantities recirculating in or emanting out of the the filter, after a predetermined number of consecutively applied samples of magnitude below a predetermined threshold magnitude have been detected.

22 Claims, 4 Drawing Figures

APPARATUS FOR SUPPRESSING LIMIT CYCLES DUE TO QUANTIZATION IN DIGITAL FILTERS

BACKGROUND OF THE INVENTION

1. Field of the Invention

This invention relates to signal filtering apparatus and, more particularly, to the discrete-time signal filters known as digital filters.

2. Description of the Prior Art

Digital filters can be constructed to perform many of the same tasks performed by conventional analog filters. Digital filters, however, operate by performing a predetermined set of arithmetic operations on successive digital (usually binary) samples of the signal to be processed. Each sample must, of course, be of finite size, i.e., each sample must be expressed in a predetermined finite number of binary digits (bits). Efficient use of the filter apparatus dictates that no more binary digits be used to represent a sample than will usually be necessary for satisfactory filter operation. As a consequence, there is always a certain level of significance (called the quantization level or step) below which the samples of a signal do not accurately represent that signal.

Among the arithmetic operations usually performed in a digital filter is multiplication of the data being processed by one or more predetermined filter coefficients. Multiplication of an M-bit data word and an M'-bit filter coefficient will in general result in a product word requiring M+M' bits for complete representation. Since these product words must be further processed in the filter (e.g., by addition to other M-bit data words), they cannot ordinarily be allowed to grow in this manner. Accordingly, they are truncated or rounded-off, usually to approximately M bits, the same number of bits used to represent data in the filter generally. Thus bits with significance below the quantization level are lost. This truncation or rounding-off is an important source of quantization error in the calculations performed by a digital filter.

As long as the data applied to a digital filter has numerical significance which is large in comparison to the quantization level, the effects of quantization can generally be ignored. Under some conditions, however, and particularly when the data falls to a relatively low level, significant computational error can occur in a digital filter as a result of quantization. Several dramatic examples of computational error due to quantization in systems with the characteristic functions of first-order and second-order recursive digital filters are discussed on pages 76 through 79 of *Linear Data-Smoothing and Prediction in Theory and Practice* by R. B. Blackman (Addison-Wesley Publishing Co., Inc., 1965). As is evident from these examples, quantization can result in significant error in the output quantities of a digital filter. The problem is of relatively little concern in nonrecursive digital filters (i.e., in filters without feedback signal processing loops) because quantities, once computed in such a filter, are output by the filter and do not influence further filter computations. In recursive digital filters, however, quantities computed by the filter are recirculated or fed back for use in subsequent filter computations. Accordingly, once a significant computational error occurs in a recursive digital filter, its effects may persist for an extended period of time. Indeed, computational errors in such filters can become self-perpetuating, producing oscillations or a DC offset in the output signal quantities of the digital filter. All of these output signal disturbances, generally referred to as limit cycles, are undesirable. Nonzero frequency limit cycles, for example, may result in a digital oscillation appearing on idle lines in transmission systems employing digital filters.

It is therefore an object of this invention to suppress limit cycles due to quantization in digital filters.

It is another object of this invention to suppress limit cycles due to multiplication truncation or round-off in digital filters.

It is a more particular object of this invention to suppress limit cycles due to quantization occurring in the output signal of a digital filter in the presence of applied samples of signals of relatively low amplitude.

It is another more particular object of this invention to suppress limit cycles due to quantization occurring in the output signal of a digital filter in the presence of applied samples of signals of relatively low frequency.

SUMMARY OF THE INVENTION

These and other objects of this invention are accomplished, in accordance with the principles of the invention, by means of apparatus for detecting applied signal samples of relatively small magnitude and clamping either the quantities recirculating in the filter or the quantities generated by the filter to zero after a predetermined number of consecutive samples below a predetermined threshold magnitude value have been applied to the filter. More particularly, each of the signal samples applied to a digital filter is also applied to a digital threshold detector. This threshold detector produces a bilevel output signal indicative of whether the magnitude of the applied sample is above or below a predetermined threshold level. The output signal of the threshold detector is applied to an N-stage binary shift register which shifts at the data rate of the filter. At any given time the states of the N stages of this shift register represent the levels of the N most recently applied signal samples relative to the threshold level established by the threshold detector. The N signals generated by the shift register are applied to a logic gate which produces an output control signal any time all N stages of the shift register indicate samples below the threshold, i.e., whenever the N most recently applied signal samples are all below threshold. Responsive to this control signal either the data recirculating in the digital filter or the quantity concurrently generated by the filter is suppressed or discarded and zero is substituted therefor.

Further features and objects of this invention, its nature, and various advantages, will be more apparent upon consideration of the attached drawing and the following detailed description.

DETAILED DESCRIPTION OF THE INVENTION

Figure 1:
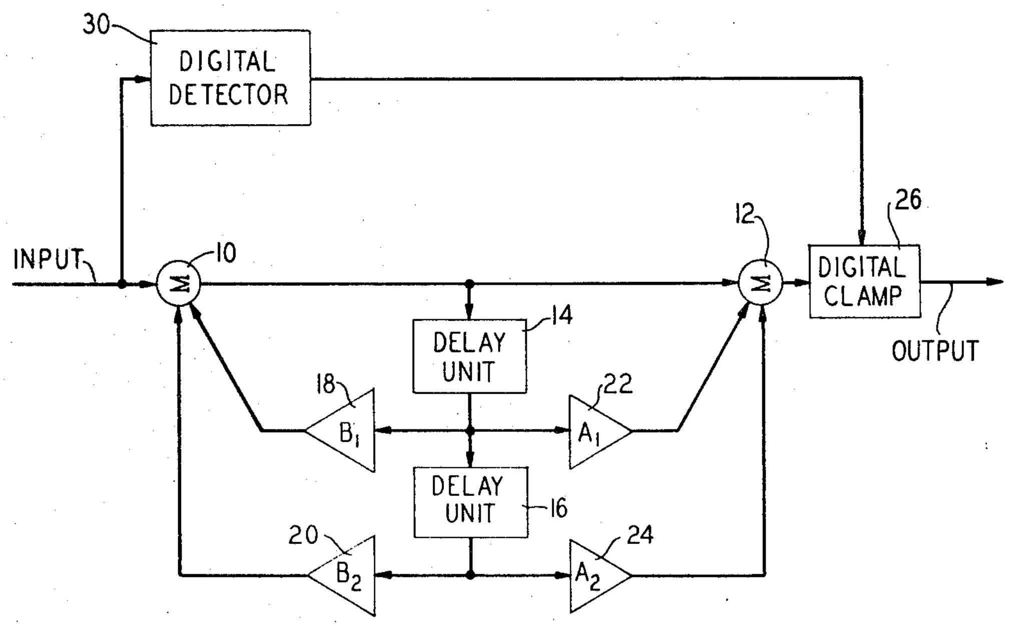
FIG. 1 is a block diagram of a general, second-order digital filter constructed in accordance with the principles of this invention.

Although it will be understood that the principles of this invention are applicable to digital filters of any order or configuration, the invention will be illustrated in context of its application to the general, second-order filter shown in FIG. 1. Filters of this order and configuration are of particular interest in any event since, as is discussed in "An Approach to the Implementation of Digital Filters" by L. B. Jackson et al. (IEEE Transactions on Audio and Electroacoustics, Vol. AU-16, No. 3, September, 1968, pp. 413–421), filters of any order can be constructed by serially connecting filters of this type.

During the normal operation of the filter of FIG. 1 (i.e., in the absence of limit cycle suppression in accordance with the principles of this invention), digitally coded signal samples are applied to adder 10 at a sampling rate $f_s$. As is well known, signals representative of the several places of each such sample may either be applied to the filter one at a time (i.e., serially) or all at once (i.e., in parallel). For convenience in this discussion, it will be assumed that the filter operates on serial signal samples. Each applied sample is additively combined with quantities concurrently generated by multipliers 18 and 20. Quantities produced by adder 10 are applied to adder 12 where they are additively combined with quantities concurrently generated by multipliers 22 and 24 to produce output signal quantities. Quantities produced by adder 10 are also applied to delay unit 14 which delays each quantity applied thereto for a period of time T (usually equal, at least in theory, to the reciprocal of $f_s$). After a suitable delay, the quantities applied to delay unit 14 are applied to multipliers 18 and 22 for multiplication by filter coefficients $B_1$ and $A_1$, respectively, and to delay unit 16 which delays each quantity applied thereto for a second period of time T. After this second delay, the quantities are applied to multipliers 20 and 24 for multiplication by filter coefficients $B_2$ and $A_2$, respectively. Thus far, the filtering operation described is that of the conventional, general, second-order digital filter.

As mentioned above, limit cycles due to quantization are likely to occur in the output quantities of a digital filter like the one shown in FIG. 1 when low level signals are applied to the filter for an extended period of time, i.e., for several consecutive samples. Action to suppress limit cycles is neither required nor desired every time a sample of low magnitude is received because quantities of significant magnitude will continue to appear in the filter for several filter cycles after the appearance of such samples. The presence of delay units in all digital filters and feedback paths in digital filters of the recursive type explains this behavior. Moreover, many signals which a digital filter can process without significant output error (e.g., a zero-mean sinusoidal signal having a substantial amplitude) will result in a certain number of low level signal samples in every cycle of the signal. Thus it is inappropriate to take corrective action against output signal error until low magnitude samples have been appearing for some time.

Just how many low level samples can be received before output signal error becomes significant will depend on several factors. Among these are the configuration of the filter, the filter coefficients, the dynamic range of the filter, the lowest signal frequency to be transmitted by the filter, the level of the input signal to be considered as zero, etc. From these considerations the designer of the filter for a particular application must determine 1) a threshold level below which magnitude any applied signal sample can be assumed to be zero and two) a number N of such samples after which output signal error becomes significant and corrective action must be taken. These determinations are well within the capabilities of those skilled in the art. The signal trace shown in FIG. 2 will be used in a further discussion of these concepts.

Figure 2:
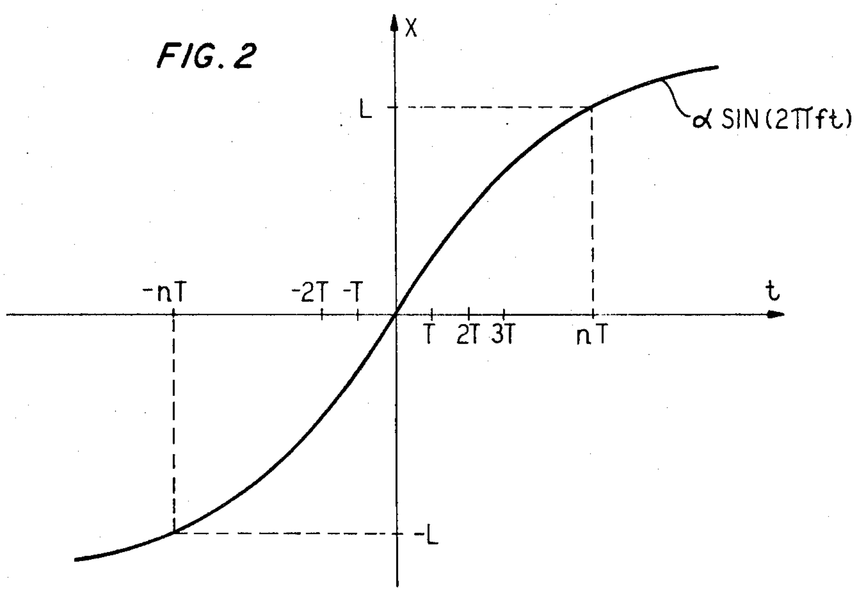
FIG. 2 is a diagram of a signal trace useful in understanding the operation of the apparatus of this invention.

Consider the sinusoidal signal of amplitude $\alpha$ and frequency $f$ shown in FIG. 2. To be processed by digital filtering apparatus like that shown in FIG. 1, this signal must be periodically sampled and each sample digitally coded for application to the filter. Assuming that a sample is taken at $t=0$ and that a sample is taken every T seconds, the signal of FIG. 2 will be sampled at the times indicated along the time axis of FIG. 2. Let L be the sample magnitude below which quantization error in the digital filter becomes significant. Let $n$ be the largest (positive) sample number (relative to sample 0 at $t=0$) for which $$L > \alpha \sin(2\pi n f T). \quad (1)$$

Because of the symmetry of the signal of FIG. 2 about $t=0$, there will be approximately $2n+1$ consecutive samples with magnitude less than $L$ in the vicinity of each change of polarity in this signal. If it has been determined, as discussed above, that $N$ consecutive samples with magnitude less than $L$ will result in significant output signal error requiring corrective action, then only signals for which $$2n + 1 < N \quad (2)$$

can be processed by the filter without the need for corrective action.

It will be evident from equations (1) and (2) that N and L are very closely related to the lowest amplitude and frequency to be transmitted without corrective action. Thus, for example, corrective action will be required in the presence of an applied signal of any frequency for which $$\alpha < L. \quad (3)$$

Similarly for signals with $$\alpha = L \quad (4)$$

only those with $$f > 1/2NT \quad (5)$$

will be transmitted without corrective action.

The manner in which it can be determined that the magnitude of a binary coded signal quantity is above or below a predetermined threshold level will be influenced to some degree by the type of binary coding employed. Perhaps the most commonly employed binary coding scheme is two's-complement coding. For binary words having M places, the following table illustrates how decimal numbers within the range of representation are represented using binary two's-complement coding:

| Number | Two's Complement Representation |
| --- | --- |
| $2^{M-1}-1$ | 01 . . . 11111 |
| . | |
| . | |
| . | |
| 4 | 00 . . . 00100 |
| 3 | 00 . . . 00011 |
| 2 | 00 . . . 00010 |
| 1 | 00 . . . 00001 |
| 0 | 00 . . . 00000 |
| −1 | 11 . . . 11111 |
| −2 | 11 . . . 11110 |
| −3 | 11 . . . 11101 |
| −4 | 11 . . . 11100 |
| −5 | 11 . . . 11011 |
| . | |
| . | |
| . | |
| $-2^{M-1}$ | 10 . . . 00000 |

For quantities in the range from $-2^K$ to $2^K-1$ inclusive, the first M-K most significant bits of two's-complement binary coded numbers are either all ones or all zeros i.e., are all identical. These leading ones or zeros are commonly referred to as place holders since they serve to fill out the word without bearing significant (magnitude) information. Although the magnitudes of the positive and negative limits of this range differ slightly, this difference can be ignored for present purposes. Given this assumption, M-bit two's-complement coded samples with magnitude below a predetermined threshold value L (where L is of the order of $2^K$) can be readily detected by identifying those samples with all ones or all zeros in the first M-K places.

In accordance with the principles of this invention each sample applied to the digital filter of FIG. 1 is also applied to digital threshold detector 30. As shown in detail in FIG. 3, samples applied to threshold detector 30 are stored in multistage shift register 32. Shift register 32, which has M-K places, shifts to the right as viewed as each place of each sample is applied to it. When the M-K most significant places of an applied sample are present in the several stages of register 32, the output signals of register 32 are strobed in any well-known manner (not shown). These several signals are applied to the M-K input terminals of logical AND gate 34 and, after logical inversion by inverters 36(1) through 36(M-K), to the M-K terminals of logical AND gate 38. Logical AND gate 34 produces an output signal which is logical one if and only if all the signals applied to it are logical one. Thus the output of logical AND gate 34 will be logical one whenever the M-K most significant places of a sample applied to the filter are all ones. Similarly, logical AND gate 38 produces an output signal which is logical one if and only if all the signals applied to it are logical one. By virtue of the presence of inverters 36, this will occur only when the M-K most significant places of a sample are all logical zeros.

The output signals of logical AND gates 34 and 38 are applied to logical OR gate 40. OR gate 40 produces an output signal which is logical one when either of the signals applied to it is logical one. Thus the output signal of OR gate 40 is logical one whenever the M-K most significant places of a sample applied to the digital filter are either all logical zeros or all logical ones. This, of course, corresponds to the occurrence of a sample whose magnitude is below threshold magnitude L, i.e., whose decimal value is in the range from $-2^K$ to $2^K-1$.

It will be evident that instead of strobing the output signals of register 32, these signals can be continuously applied to the above-described logic network and the output signal of logical OR gate 40 strobed when the M-K most significant places of an applied sample are present in register 32. This can be done, for example, by applying the output signal of OR gate 40 to an AND gate and enabling the AND gate with an appropriately timed strobe signal.

The output signal of OR gate 40 or of the strobed AND gate mentioned immediately above is applied to N-stage shift register 42 which shifts to the right as viewed at the sampling rate $f_s$. Thus at any given time the N signals produced by the N stages of register 42 represent the output of OR gate 40 with respect to the N samples most recently applied to the filter. More particularly, these N signals are indicative of the magnitudes of the N most recently applied samples relative to the predetermined threshold level.

The N output signals of shift register 42 are applied to N-input logical AND gate 44. AND gate 44 produces an output signal which is logical one when all of the signals applied to it are logical one and logical zero otherwise. Accordingly, the output signal of AND gate 44 is logical one only when the magnitudes of the N consecutive samples most recently applied to the digital filter are below threshold. The output signal of AND gate 44 therefore indicates the need to take corrective action with respect to quantization error in the digital filter. More particularly, this signal can be used to control the apparatus which effects this corrective action.

Since the output quantities of the digital filter of FIG. 1 should approach zero when the samples applied to the filter are zero, one way to suppress limit cycles due to quantization is to suppress the erroneous quantities generated by the filter and substitute zero quantities therefor. Accordingly, controllable clamping device 26 is provided in the output lead of the filter of FIG. 1. This device normally passes quantities produced by adder 12 to the output terminal of the filter unaltered. When, however, N consecutive signal samples below the threshold established by threshold detector 30 have been detected (as indicated by an output signal of logical one from detector 30), clamp 26 blocks the quantity concurrently produced by adder 12 and produces a quantity representative of zero in its place. Accordingly, clamp 26 may be a double throw switch which connects adder 12 to the output of the filter when the output signal of detector 30 is logical zero and which switches to connect the output of the filter to a logical zero level when the output signal of detector 30 changes to logical one.

Figure 4:
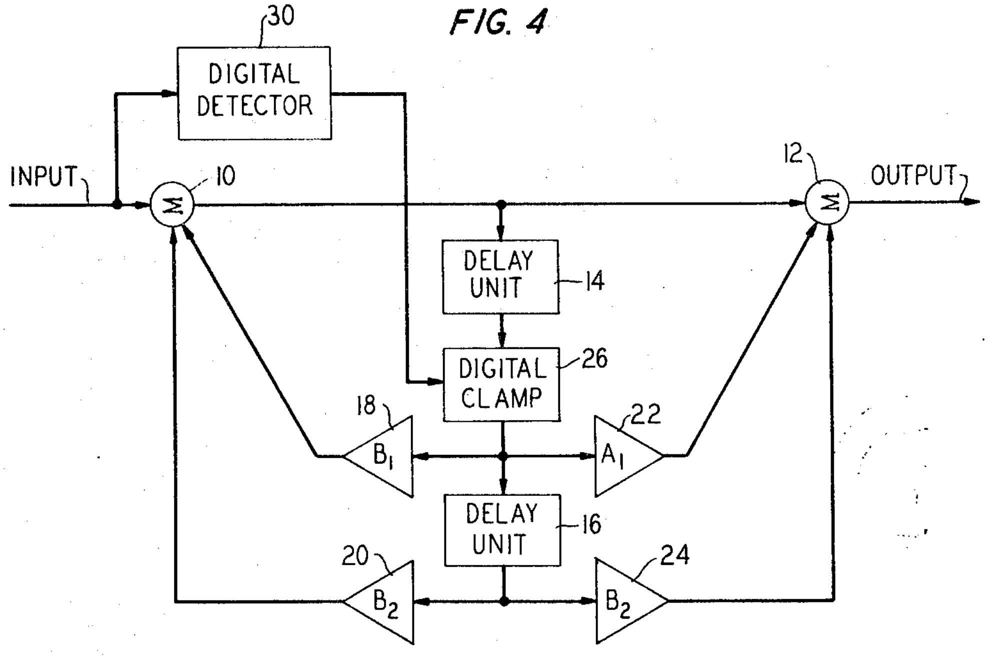
FIG. 4 is a block diagram showing a modification of the apparatus of FIG. 1.

Another way to suppress limit cycles due to quantization in accordance with the principles of this invention is to clamp the recirculating signal quantity to zero when N consecutive samples below threshold are indicated. The output quantities of the filter will then fall rapidly to zero or to correspondence with the applied samples as is desired. A digital clamping device like clamp 26 operating on the output quantities of delay unit 14 as shown in FIG. 4, for example, can be used to suppress erroneous quantities recirculating in the filter. The clamping of the quantities stored in delay unit 14 will result in zero quantities being produced by all of multipliers 18, 20, 22, and 24 after just one or two filter cycles. Thereafter, samples applied to the filter will pass through adders 10 and 12 unaltered to appear as the output quantities as long as clamping continues.

In any event, as soon as a sample not in the range from $-2^K$ to $2^K-1$ is applied to the filter, the output signal of detector 30 will return to logical zero. The clamping of either the output quantities or the recirculating quantities therefore ceases and the filter returns to normal operation.

Figure 3:
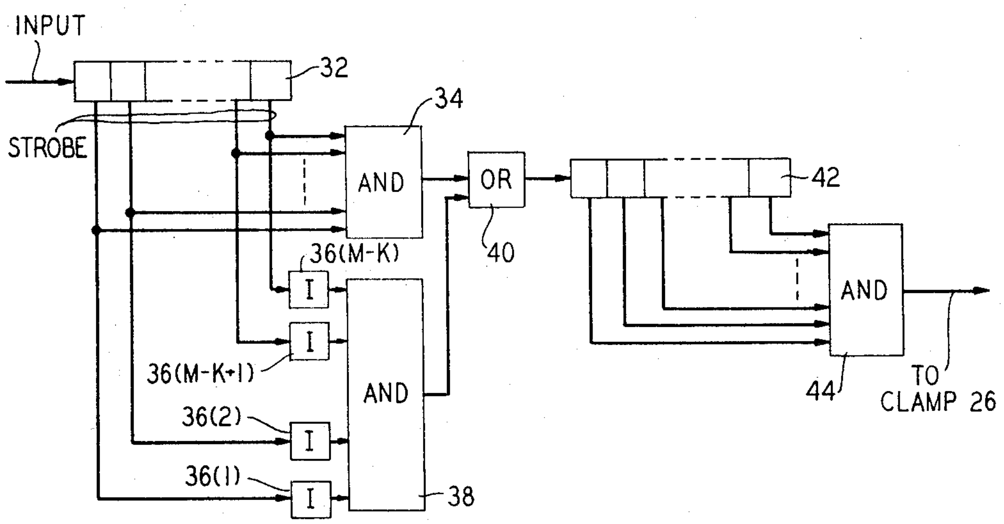
FIG. 3 is a block diagram showing in more detail the digital threshold detector of the apparatus of FIG. 1.

The logic network of FIG. 3 is by no means the only network suitable for use in implementing digital detector 30. One possible alternative is to replace inverters 36 and AND gate 38 with a logical NOR gate. As is well known to those skilled in the art, a NOR gate produces an output signal which is logical one if and only if all the signals applied to it are logical zero. A NOR gate is therefore the functional equivalent of the inverter-AND gate combination of FIG. 3. Alternatively, AND gates 34 and 38 can be replaced by NAND gates and OR gate 40 replaced by an EXCLUSIVE OR gate.

Digital filters are very often time-shared, samples from several sources being applied to the filter in a predetermined sequence. In that event level detection and error correction apparatus may be provided for each source or time-shared among the several sources. The corrective action based on the detection of consecutive low level samples from a given source is then taken with respect to recirculating or output quantities associated with that source.

It is to be understood that the embodiments shown and described herein are illustrative of the principles of this invention only and that modifications may be implemented by those skilled in the art without departing from the scope and spirit of the invention. For example, it has been assumed, as is the case in most transmission system applications of digital filters, that data is applied to the filter serially, i.e., one bit at a time. If instead, the data is applied or is available in parallel (i.e., all the bits of a given sample are available simultaneously), shift register 32 in detector 30 can be eliminated and the appropriate data bits applied directly to the remainder of the logic network. If sign-magnitude coding is used instead of two's-complement coding, then low level samples are evident from zeros in the most significant magnitude places of the samples. In that event inverters 36 and gates 38 and 40 can be omitted and AND gate 34 replaced by a NOR gate. The most significant magnitude bits of samples captured in shift register 32 are then applied only to a NOR gate, the output signal of the NOR gate being applied directly to shift register 42. Finally, as discussed in detail above, the principles of this invention are applicable to digital filters having any order and configuration.

What is claimed is:

1. Apparatus for suppressing limit cycles due to quantization occurring in a digital filter in response to signal samples of low magnitude consecutively applied to said digital filter comprising: first means, responsive to said signal samples, for generating a control signal indicative of the occurrence of a predetermined number of consecutive signal samples with magnitudes below a predetermined threshold level; and second means responsive to said control signal for altering the quantities calculated by said digital filter to suppress said limit cycles.

2. The apparatus defined in claim 1 wherein said first means comprises: threshold detecting means, responsive to said signal samples, for producing logic output signals indicative of the magnitude of each of said signal samples to said predetermined threshold level; means for storing said logic output signals; and logic means, responsive to said means for storing, for producing said control signal when the magnitudes of all of said predetermined number of consecutively applied signal samples are indicated to be below said predetermined threshold level.

3. The apparatus defined in claim 2 wherein said second means comprises means for clamping the signal quantity recirculating in said digital filter to logical zero.

4. The apparatus defined in claim 2 wherein said second means comprises means for clamping the output signal quantity of said digital filter to logical zero.

5. Apparatus for suppressing limit cycles due to quantization occurring in a digital filter in response to signal sample quantities of low magnitude sequentially applied to said digital filter comprising: first means, responsive to said signal sample quantities, for producing an output signal when the magnitudes of a predetermined number N of the most recently applied signal sample quantities are all below a predetermined threshold level; and second means, responsive to said output signal, for altering at least one of the quantities concurrently computed by said digital filter.

6. The apparatus defined in claim 5 wherein said first means comprises: a threshold detector responsive to each of said signal sample quantities with magnitude below said predetermined threshold; a multistage shift register for storing the N most recent responses of said threshold detector; and logic means for producing said output signal when all of said stored responses indicate sample quantities with magnitudes below said predetermined threshold level.

7. The apparatus defined in claim 6 wherein said second means comprises means for clamping to logical zero at least one of the signal quantities recirculating in said digital filter.

8. The apparatus defined in claim 6 wherein said second means comprises means for clamping to logical zero the output signal quantity of said digital filter.

9. Apparatus for suppressing limit cycles due to quantization in a digital filter occurring in response to sequentially applied digitally coded signal sample quantities of low magnitude comprising:

threshold detector means responsive to each of said sequentially applied signal sample quantities for producing a first control signal indicative of the magnitude of each of said signal sample quantities relative to a predetermined threshold magnitude value;

multistage storage register means for storing said first control signal for the N consecutive signal sample quantities most recently applied to said digital filter;

logic means responsive to said storage register output for producing a second control signal indicative of whether the magnitudes of all of said N sample quantities are below said threshold magnitude value; and means responsive to said second control signal for altering the quantity computed by said digital filter when the magnitudes of all of said N sample quantities are below said threshold magnitude value.

10. The apparatus defined in claim 9 wherein said threshold detector means comprises means for producing said first control signal indicative of the condition that a predetermined number of the most significant bits of each of said digitally coded sample quantities are place holders.

11. The apparatus defined in claim 10 wherein said means for altering comprises means for replacing the output quantity computed by said digital filter by a quantity representative of logical zero.

12. The apparatus defined in claim 10 wherein said means for altering comprises means for replacing at least one of the quantities recirculating in said digital filter by a quantity representative of logical zero.

13. In a digital filter for processing sequentially applied binary coded signal sample quantities and including at least one recirculating signal processing loop, apparatus for suppressing computational error due to quantization comprising:

digital threshold detecting means responsive to each of said signal sample quantities for producing an output signal when the magnitude of said signal sample quantity is below a predetermined threshold value;

multistage storage register means for storing said output signal for a predetermined number of the most recently applied sample quantities;

logic means, responsive to said storage register means, for producing a control signal when the magnitudes of all of said predetermined number of sample quantities are indicated to be below said predetermined threshold value; and means responsive to said control signal for altering at least one of the quantities concurrently computed by said digital filter to suppress said computational error represented by said concurrently computed quantity.

14. The apparatus defined in claim 13 wherein said digital threshold detecting means comprises means for producing said output signal when the binary digits in all of a predetermined number of the most significant places of an applied sample quantity are place holders.

15. The apparatus defined in claim 13 wherein said means for altering comprises means for replacing the output quantity computed by said digital filter by a quantity representative of logical zero.

16. The apparatus defined in claim 13 wherein said means for altering comprises means for replacing the quantity recirculating in said recirculating loop by a quantity representative of logical zero.

17. In a digital filter for processing sequentially applied two's-complement binary coded digital signal sample quantities and including at least one recirculating signal processing loop, apparatus for suppressing limit cycles due to quantization employing digital means that assume a first signal level or a second signal level comprising:

digital threshold detecting means responsive to each of said signal sample quantities for producing a first output signal having said first signal level when the magnitude of said sample quantity is below a predetermined threshold value, and having said second signal level otherwise;

multistage storage register means for storing said first output signal for a predetermined number of the most recently applied sample quantities;

logic means responsive to said storage register means for producing a second output signal having said first signal level when said stored first output signal for all of said most recently applied sample quantities is of said first level, and having said second signal level otherwise; and controllable clamping means for altering at least one of the quantities computed by said digital filter when said second output signal is of said first signal level.

18. The apparatus defined in claim 17 wherein said digital threshold detecting means comprises means for producing said first level of said first output signal when the binary digits in all of a predetermined number of the most significant places of an applied sample quantity are place holders.

19. The apparatus defined in claim 18 wherein said threshold detecting means comprises:

first means for producing a third output signal having said first signal level when the binary digits in all of a predetermined number of the most significant bits of said signal sample quantity are logical, and having said second signal level otherwise;

second means for producing a fourth output signal having said first signal level when the binary digits in all of said predetermined number of the most significant bits of said signal sample quantity are logical one, and having said second signal level otherwise; and third means for producing said first output signal level having said first signal level when either said first output signal, or said second output signal are at said first signal level.

20. The apparatus defined in claim 17 wherein said controllable clamping means comprises means for substituting a quantity representative of logical zero for the output quantity of said filter.

21. The apparatus defined in claim 17 wherein said controllable clamping means comprises means for substituting a quantity representative of logical zero for the quantity recirculating in said recirculating signal processing loop.

22. The apparatus defined in claim 17 wherein said digital threshold detecting means comprises means for producing said first output signal having said first signal level when the binary digits in all of a predetermined number of the most significant places of said signal sample quantity are identical.

* * * * *